(12) United States Patent
Lee et al.

(10) Patent No.: US 8,703,014 B2
(45) Date of Patent: *Apr. 22, 2014

(54) LUMINESCENT SUBSTANCES HAVING EU$^{2+}$-DOPED SILICATE LUMINOPHORES

(75) Inventors: Chung Hoon Lee, Ansan-si (KR); Walter Tews, Greifswald (DE); Gundula Roth, Levenhagen (DE); Detlef Starick, Greifswald (DE)

(73) Assignees: Seoul Semiconductor Co., Ltd., Seoul (KR); LITEC-LP GmbH, Greifswald (DE)

( * ) Notice: Subject to any disclaimer, the term of this patent is extended or adjusted under 35 U.S.C. 154(b) by 396 days.

This patent is subject to a terminal disclaimer.

(21) Appl. No.: 12/773,514

(22) Filed: May 4, 2010

(65) Prior Publication Data

US 2010/0327229 A1 Dec. 30, 2010

(30) Foreign Application Priority Data

Jun. 24, 2009 (DE) .................. 10 2009 030 205
Aug. 28, 2009 (KR) .................. 10-2009-0080263

(51) Int. Cl.
  *C09K 11/08* (2006.01)
  *C09K 11/66* (2006.01)
(52) U.S. Cl.
  USPC .................................. 252/301.4 F
(58) Field of Classification Search
  USPC ....... 252/301.4 F, 301.6 R, 301.6 F; 313/483, 313/486, 503, 504
  See application file for complete search history.

(56) References Cited

U.S. PATENT DOCUMENTS

| | | |
|---|---|---|
| 2,110,162 A | 3/1938 | Leverenz |
| 2,402,760 A | 6/1946 | Leverenz |
| 2,570,136 A | 10/1951 | Lyon |
| 2,617,773 A | 11/1952 | Nagy et al. |
| 2,719,128 A | 9/1955 | Kressin |
| 2,780,600 A | 2/1957 | Wollentin |
| 3,143,510 A | 8/1964 | Wanmaker et al. |
| 3,598,752 A | 8/1971 | Sisneros |
| 3,644,212 A | 2/1972 | McAllister et al. |
| 3,893,939 A | 7/1975 | De Kalb et al. |
| 3,905,911 A | 9/1975 | Kelsey, Jr. et al. |
| 4,215,289 A | 7/1980 | De Hair et al. |
| 4,770,950 A | 9/1988 | Ohnishi |
| 4,972,086 A | 11/1990 | Bryan et al. |
| 5,032,316 A | 7/1991 | Takahashi et al. |
| 5,433,295 A | 7/1995 | Murphy |
| 5,472,636 A | 12/1995 | Forster et al. |
| 5,518,808 A | 5/1996 | Bruno et al. |
| 5,770,110 A | 6/1998 | Schrell et al. |
| 5,770,111 A | 6/1998 | Moriyama et al. |
| 5,853,614 A | 12/1998 | Hao et al. |
| 5,952,681 A | 9/1999 | Chen |
| 5,965,192 A | 10/1999 | Potter |
| 5,998,925 A | 12/1999 | Shimizu et al. |
| 6,045,722 A | 4/2000 | Leblans et al. |
| 6,066,861 A | 5/2000 | Hohn et al. |
| 6,084,250 A | 7/2000 | Justel et al. |
| 6,373,184 B1 | 4/2002 | Suh et al. |
| 6,472,765 B1 | 10/2002 | Sano et al. |
| 6,482,664 B1 | 11/2002 | Lee et al. |
| 6,565,771 B1 | 5/2003 | Ono et al. |
| 6,670,751 B2 | 12/2003 | Song et al. |
| 6,686,691 B1 | 2/2004 | Mueller et al. |
| 6,842,664 B2 | 1/2005 | Harada et al. |
| 6,982,045 B2 | 1/2006 | Menkara et al. |
| 6,982,048 B1 | 1/2006 | Atwater et al. |
| 6,987,353 B2 | 1/2006 | Menkara et al. |
| 7,019,335 B2 | 3/2006 | Suenaga |
| 7,029,602 B2 | 4/2006 | Oshio |
| 7,045,078 B2 | 5/2006 | Choi |
| 7,138,770 B2 | 11/2006 | Uang et al. |
| 7,189,340 B2 | 3/2007 | Shimomura et al. |
| 7,206,507 B2 | 4/2007 | Lee et al. |
| 7,229,571 B2 | 6/2007 | Ezuhara et al. |
| 7,244,965 B2 | 7/2007 | Andrews et al. |

(Continued)

FOREIGN PATENT DOCUMENTS

| | | |
|---|---|---|
| AT | 410266 | 3/2003 |
| CN | 1218084 | 6/1999 |

(Continued)

OTHER PUBLICATIONS

Toropov et al., ' A Study of the Formation of Solid Solutions of Tristrontium Silicate With Some Oxyorthosilicates of the Rare Earths (La, Nd, Y), 1963, Inorganic and Analytical Chemistry, No. 12, pp. 1918-1921.*
Copending U.S. Appl. No. 12/767,253.*
Feldmann C., "Inorganic Luminescent Materials: 100 Years of Research and Application", Adv. Funct. Matter, 2003, pp. 511-516.
G. Blasse, B.C. Grabmeier, "Luminescent Materials", Springer, 1994, 87-90.
B. Cordero, V. Gómez, A. E. Platero-Prats, M. Revés, J. Echeverria, E. Cremades, F. Barragán, and S. Alvarez, "Covalent radii revisted", Dalton Trans., (2008), pp. 2832-2838.
R.J. Angel et al., "Structure and twinning of single-crystal MgSiO3 garnet synthisized at 17 GPa and 1800° C", American Minerologist, 74 (1989) pp. 509-512.

(Continued)

*Primary Examiner* — Emily Le
*Assistant Examiner* — Lynne Edmondson
(74) *Attorney, Agent, or Firm* — H.C. Park & Associates, PLC

(57) ABSTRACT

Exemplary embodiments of the present invention disclose inorganic luminescent substances with Eu$^{2+}$-doped silicate luminophores, in which solid solutions in the form of mixed phases between alkaline earth metal oxyorthosilicates and rare earth metal oxyorthosilicates are used as base lattices for the Eu$^{2+}$ activation leading to the luminescence. These luminophores are described by the general formula (1-x) $M^{II}_3SiO_5 \cdot xSE_2SiO_5$:Eu, in which $M^{II}$ preferably represents strontium ion or another alkaline earth metal ion, or another divalent metal ion selected from the group consisting of the magnesium, calcium, barium, copper, zinc, and manganese. These ions may be used in addition to strontium and also as mixtures with one another.

16 Claims, 2 Drawing Sheets

(56) References Cited

U.S. PATENT DOCUMENTS

| | | |
|---|---|---|
| 7,332,746 B1 | 2/2008 | Takahashi et al. |
| 7,468,147 B2 | 12/2008 | Shida et al. |
| 7,554,129 B2 | 6/2009 | Roth et al. |
| 7,608,200 B2 | 10/2009 | Seto et al. |
| 7,679,101 B2 | 3/2010 | Ota et al. |
| 7,679,281 B2 | 3/2010 | Kim et al. |
| 8,535,564 B2 * | 9/2013 | Lee et al. .................. 252/301.4 F |
| 2002/0015013 A1 | 2/2002 | Ragle |
| 2003/0038295 A1 | 2/2003 | Koda |
| 2003/0168636 A1 | 9/2003 | Dobson et al. |
| 2004/0051111 A1 | 3/2004 | Ota et al. |
| 2004/0104391 A1 | 6/2004 | Maeda et al. |
| 2004/0135504 A1 | 7/2004 | Tamaki et al. |
| 2004/0136891 A1 | 7/2004 | Kijima et al. |
| 2004/0206970 A1 | 10/2004 | Martin |
| 2004/0251809 A1 | 12/2004 | Shimomura et al. |
| 2005/0001537 A1 | 1/2005 | West et al. |
| 2005/0029927 A1 | 2/2005 | Setlur et al. |
| 2005/0117334 A1 | 6/2005 | Lee et al. |
| 2005/0139846 A1 | 6/2005 | Park et al. |
| 2005/0141048 A1 | 6/2005 | Mizutani |
| 2005/0239227 A1 | 10/2005 | Aanegola et al. |
| 2005/0264161 A1 | 12/2005 | Oaku et al. |
| 2005/0274930 A1 | 12/2005 | Roth et al. |
| 2005/0274972 A1 | 12/2005 | Roth et al. |
| 2006/0076883 A1 | 4/2006 | Himaki et al. |
| 2006/0158090 A1 | 7/2006 | Wang et al. |
| 2006/0261309 A1 | 11/2006 | Li et al. |
| 2006/0261350 A1 | 11/2006 | Kawazoe et al. |
| 2006/0267042 A1 | 11/2006 | Izuno et al. |
| 2007/0029526 A1 | 2/2007 | Cheng et al. |
| 2007/0247051 A1 | 10/2007 | Kuze et al. |
| 2007/0284563 A1 | 12/2007 | Lee et al. |
| 2008/0036364 A1 | 2/2008 | Li et al. |
| 2008/0067472 A1 | 3/2008 | Roth et al. |
| 2008/0067920 A1 | 3/2008 | Roth et al. |
| 2008/0224163 A1 | 9/2008 | Roth et al. |
| 2009/0050847 A1 | 2/2009 | Xu et al. |
| 2009/0050849 A1 | 2/2009 | Lee et al. |
| 2009/0134413 A1 | 5/2009 | Roth et al. |
| 2009/0152496 A1 | 6/2009 | Roth et al. |
| 2009/0262515 A1 | 10/2009 | Lee et al. |
| 2009/0303694 A1 | 12/2009 | Roth et al. |
| 2010/0002454 A1 | 1/2010 | Lee et al. |
| 2010/0096974 A1 * | 4/2010 | Setlur et al. .................. 313/487 |
| 2010/0165645 A1 | 7/2010 | Lee et al. |
| 2010/0207132 A1 | 8/2010 | Lee et al. |
| 2010/0224830 A1 * | 9/2010 | Park et al. .................. 252/301.6 F |

FOREIGN PATENT DOCUMENTS

| | | |
|---|---|---|
| CN | 1289454 | 3/2001 |
| CN | 1317537 | 10/2001 |
| CN | 1344777 | 4/2002 |
| CN | 1434521 | 8/2003 |
| CN | 1707819 | 12/2005 |
| DE | 19528758 | 12/1996 |
| DE | 10233050 | 2/2004 |
| DE | 10259946 | 7/2004 |
| EP | 0094132 | 11/1983 |
| EP | 0382295 | 8/1993 |
| EP | 0862794 | 9/1998 |
| EP | 0896994 | 2/1999 |
| EP | 1249873 | 10/2002 |
| EP | 1605030 | 12/2005 |
| EP | 2031038 | 3/2009 |
| GB | 1336053 | 11/1973 |
| GB | 2016034 | 9/1979 |
| JP | 31-1118 | 2/1956 |
| JP | 33-8177 | 9/1958 |
| JP | 38-6082 | 5/1963 |
| JP | 39-8803 | 5/1964 |
| JP | 47-6258 | 4/1972 |
| JP | 49-38994 | 10/1974 |
| JP | 55-135190 | 10/1980 |
| JP | 57-109886 | 7/1982 |
| JP | 61-258892 | 11/1986 |
| JP | 62-197487 | 9/1987 |
| JP | 5-78659 | 3/1993 |
| JP | 9-40946 | 2/1997 |
| JP | 9-153644 | 6/1997 |
| JP | 2001-308393 | 11/2001 |
| JP | 2001-524163 | 11/2001 |
| JP | 2002-50795 | 2/2002 |
| JP | 2002-057376 | 2/2002 |
| JP | 2002-094122 | 3/2002 |
| JP | 2002-97465 | 4/2002 |
| JP | 2002-97466 | 4/2002 |
| JP | 2002-173677 | 6/2002 |
| JP | 2002-335019 | 11/2002 |
| JP | 2002-359403 | 12/2002 |
| JP | 2002-368277 | 12/2002 |
| JP | 2003-064358 | 3/2003 |
| JP | 2003-152229 | 5/2003 |
| JP | 2003-183649 | 7/2003 |
| JP | 2003-224306 | 8/2003 |
| JP | 2003-321675 | 11/2003 |
| JP | 2004-006582 | 1/2004 |
| JP | 2004-010786 | 1/2004 |
| JP | 2004-505470 | 2/2004 |
| JP | 2004-071726 | 3/2004 |
| JP | 2004-71807 | 3/2004 |
| JP | 2004-127988 | 4/2004 |
| JP | 2004-134699 | 4/2004 |
| JP | 2004-192833 | 7/2004 |
| JP | 2001-115157 | 12/2004 |
| JP | 2005-167177 | 6/2005 |
| JP | 2006-073656 | 3/2006 |
| JP | 2006-173433 | 6/2006 |
| JP | 2007-186674 | 7/2007 |
| JP | 2009-007545 | 1/2009 |
| KR | 10-232395 | 12/1999 |
| KR | 10-2001-0032450 | 4/2001 |
| KR | 10-2001-0050839 | 6/2001 |
| KR | 10-2001-0101910 | 11/2001 |
| KR | 10-2002-0000835 | 1/2002 |
| KR | 10-2002-0053975 | 7/2002 |
| KR | 10-0392363 | 7/2002 |
| KR | 10-2002-0079513 | 10/2002 |
| KR | 10-2003-0063211 | 7/2003 |
| KR | 10-2003-0082395 | 10/2003 |
| KR | 10-0426034 | 7/2004 |
| KR | 10-2004-0088418 | 10/2004 |
| KR | 10-2005-0008426 | 1/2005 |
| KR | 10-2005-0070349 | 7/2005 |
| KR | 10-2005-0098462 | 10/2005 |
| KR | 10-2005-0106945 | 11/2005 |
| KR | 10-2005-0117164 | 12/2005 |
| KR | 10-2006-0034056 | 4/2006 |
| KR | 10-0626272 | 9/2006 |
| KR | 10-2006-0134728 | 12/2006 |
| KR | 10-2007-0016900 | 2/2007 |
| KR | 10-2007-0050833 | 5/2007 |
| KR | 10-2007-0084659 | 8/2007 |
| KR | 10-2007-0086483 | 8/2007 |
| KR | 10-2008-0046789 | 5/2008 |
| KR | 10-2008-0074241 | 7/2008 |
| KR | 10-2008-0075181 | 7/2008 |
| TW | I328885 | 3/1999 |
| WO | 1996-32457 | 10/1996 |
| WO | 98-05078 | 2/1998 |
| WO | 98-12757 | 3/1998 |
| WO | 98-39805 | 9/1998 |
| WO | 98-42798 | 10/1998 |
| WO | 00-19546 | 4/2000 |
| WO | 01-41215 | 6/2001 |
| WO | 02-054502 | 7/2002 |
| WO | 02-054503 | 7/2002 |
| WO | 2002-089219 | 11/2002 |
| WO | 03-021691 | 3/2003 |
| WO | 2004-085570 | 10/2004 |
| WO | 2004/085570 | 10/2004 |
| WO | 2004-111156 | 12/2004 |

(56) References Cited

FOREIGN PATENT DOCUMENTS

| WO | 2005-068584 | 7/2005 |
|---|---|---|
| WO | 2005-112137 | 11/2005 |
| WO | 2005109532 | 11/2005 |
| WO | 2006-043682 | 4/2006 |
| WO | 2006-068359 | 6/2006 |
| WO | 2006/081803 | 8/2006 |
| WO | 2006-081803 | 8/2006 |
| WO | 2006/109659 | 10/2006 |
| WO | 2007-035026 | 3/2007 |
| WO | 2007/035026 | 3/2007 |
| WO | 2007-055538 | 5/2007 |
| WO | 2007-069869 | 6/2007 |
| WO | 2007-114614 | 11/2007 |
| WO | 2009028818 | 3/2009 |

OTHER PUBLICATIONS

P.A. Cox, "Transition Metal Oxides", Oxford University Press, 1995, p. 105.
Garcia Solé, L.E. Bausá, D. Jaque, "An Introduction to the Optical Spectroscopy of Inorganic Solids", Wiley, 2005, pp. 163-164.
G. Blasse, B.C. Grabmeier, "Luminescent Materials", Springer, 1994, p. 25.
S. Shionoya, W.M. Yen, "Phospher Handbook" CRC press, 1999, ch. 3.3, pp. 183-184.
Garcia Solé, L.E. Bausá, D. Jaque, "An Introduction to the Optical Spectroscopy of Inorganic Solids", Wiley, 2005, pp. 132-133.
S. Shionoya, W.M. Yen, "Phosphor Handbook" CRC press, 1999, ch. 3.3, pp. 179-182.
G. Blasse, A. Bril, "Characteristic Luminescence", Philips Technical Review, 31 (1970) 304, p. 306.
G. Blasse, B.C. Grabmeier, "Luminescent Materials", Springer, 1994, pp. 40-47.
Non-Final Office Action of U.S. Appl. No. 11/568,769 issued on Feb. 16, 2011.
Non-Final Office Action of U.S. Appl. No. 13/004,554 issued on Mar. 15, 2011.
Notice of Allowance of U.S. Appl. No. 11/024,722 issued on Mar. 10, 2011.
Final Office Action of U.S. Appl. No. 12/196,923 issued on Mar. 4, 2011.
Notice of Allowance of U.S. Appl. No. 11/948,845 issued on Mar. 23, 2011.
International Search Report dated Jul. 12, 2007 for PCT Application No. PCT/KR2007/001587.
International Search Report dated Mar. 21, 2007 for PCT Application No. PCT/KR2006/005500.
International Search Report dated Feb. 20, 2007 for PCT Application No. PCT/KR2006/004716.
International Search Report dated Oct. 24, 2005 for PCT Application No. PCT/KR2005/002332.
International Search Report dated Oct. 13, 2005 for PCT Application No. PCT/KR2005/002333.
International Search Report dated Aug. 12, 2005 for PCT Application No. PCT/KR2005/001288.
International Search Report dated Aug. 12, 2005 for PCT Application No. PCT/KR2005/001287.
International Search Report dated Feb. 27, 2009 for PCT Application No. PCT/KR2008/004734.
International Search Report dated Feb. 11, 2009 for PCT Application No. PCT/KR2008/004733.
Joung Kyu Park, et al., "Silicate Phosphors for White LEDs Identified Through Combinatorial Chemistry", Electrochemical and Solid-State Letters, vol. 10(2), pp. J15-J18, (2007), XP-00251106706-11-12).
Joung Kyu Park, et al., "Luminescence Characteristics of Yellow Emitting Ba3SiO5:EU2+ Phosphor", Journal of Materials Science 40 (2005), pp. 2069-2071, XP-002511068.
Search Report dated Feb. 2, 2009 for EP Application No. EP08014684.
S.D. Jee, et al., "Photoluminescence properties of Eu2+-activated Sr3SiO5 Phosphors," J. Mater Sci. 41 (2006), pp. 3139-3141.
G. Blasse, et al., "Fluorescence of Europium2+-activated silicates," Philips Res. Repts 23 (1968), pp. 189-199.
G. Roth, et al. "Advanced Silicate Phosphors for improved white LED", Global Phosphor Summit Seoul/Korea, Mar. 5-7, 2007.
H.G. Kang, et al., "Embodiment and Luminescence Properties of Sr3SiO5:Eu(yellow-orange phosphor) by co-doping lanthanide", Solid State Phenomena, vol. 124-126 (2007) pp. 511-514.
T.L. Barry, "Fluorescence of Eu2+ Activated Phases in Binary Alkaline Earth Orthosilicate Systems", J. Electrochem Soc., Nov. 1968, pp. 1181-1184.
Notice of Allowance dated Dec. 1, 2008 issued in U.S. Appl. No. 11/024,702.
Chinese Office Action corresponding to Patent App No. 2005800150173 dated Dec. 28, 2007.
Final OA dated Oct. 22, 2007 issued in U.S. Appl. No. 11/024,722.
Office Action dated Dec. 28, 2007 corresponding to China App No. 200580016844.4.
X. W. Sun et al., "Pulsed Laser Deposition of Silicate Phosphor Thin Films", Appl. Phys. A 69, 1999, 5 pp.
W.L. Wanmaker et al. "Luminescence of Phosphors Based on the Host Lattice ABGe2O6 (A, B=Ca, Sr, Ba)" Journal of Solid State Chemistry 3, (1971), pp. 194-196.
Declaration under 37 CFR 1.132 dated Aug. 24, 2007.
Non-Final OA mailed May 23, 2007 for U.S. Appl. No. 11/024,722 entitled "Luminescent Material".
Ageeth A. Bol et al., "Luminescence of ZnS:Cu2+", Journal of Luminescence, No. 99, 2002, pp. 325-334.
J.F. Suyver et al., "Luminescence of nanocrystalline ZnSe:Cu", Applied Physics Letters, vol. 79, No. 25, Dec. 17, 2001, pp. 4222-4224.
Ping Yang et al., "Photoluminescence of Cu+-doped and Cu2+-doped ZnS nanocrystallites", Journal of Physics and Chemistry of Solids, No. 63, 2002, pp. 638-643.
S. Shionoya et al., (Eds.), "Principal phosphor materials and their optical properties" in Phosphor Handbook, CRC Press, 1999, pp. 231-255.
A. Scacco et al., "Optical Spectra of Cu2+ Ions in LiF Crystals", Radiation Effects and Defects in Solids, vol. 134, 1995, pp. 333-336.
Lujcan Dubicki et al., "The First d-d Fluorescence of a Six-Coordinate Copper (II) Ion", J. Am. Chem. Soc. 1989, No. 111, pp. 3452, 3454.
A.B.P. Lever, "Inorganic Electronic Spectroscopy", 2nd ed., Elsevier, 1984, pp. 355 and 557-559.
A.G. Shenstone, "The Third Spectrum of Copper (Cu III)", Journal of Research of the National Bureau of Standards—A. Physics and Chemistry, vol. 79A, No. 3, May-Jun. 1975, pp. 497-521.
S. Shinoya et al. (Eds.), "Principal phosphor materials and their optical properties" in Phosphor Handbook, CRC Press, 1999, p. 836.
First Office Action of the PRC to Chinese Patent App No. 20051002304.2 dated Feb. 15, 2008.
Yang, "Up- Conversion Fluorescence in Er3 + Yb3 + Co- Doped Oxy - Fluoride Compound Materials Based on GeO2", Natural Science Journal of Xiangtan University, vol. 23, No. 2, 2001, pp. 37-41.
Bernhardt, Investigations of the Orange Luminescence of PbMo04 Crystals, Phys. Stat. Sol (a), 91, 643, 1985, pp. 643-647.
Butler, "Fluorescent Lamp Phosphors", The Pennsylvania State University Press, 1980, pp. 175-176.
Butler, "Fluorescent Lamp Phosphors", The Pennsylvania State University Press, 1980, pp. 181-182.
Butler, "Fluorescent Lamp Phosphors", The Pennsylvania State University Press, 1980, pp. 281-284.
"Phosphors for Mercury Lamps" https:/www.lamptech.co.uk/Docuemnts/M14%20Phosphors.htm 2003 (2 pages).
Blasse, "Radiationless Processes in Luminescent Materials", Radiationless Processes, 1980, pp. 287-289, 293.
Shinonoya, "Phosphor Handbook", edited under the auspice of Phosphor Research Society, CRC Press, 1999, pp. 204-205.
Shinonoya, "Phosphor Handbook", edited under the auspice of Phosphor Research Society, CRC Press, 1999, p. 238-239, 241.
van Gool, "Philips Res. Rept. Suppl." 3, 1, 1961, pp. 1-9, 30-51, 84-85.

(56) References Cited

OTHER PUBLICATIONS

Declaration Under Rule 37 CFR 1.132 of Ulrich Kynast dated Sep. 6, 2008.
G. Blasse, "Characteristic Luminescence", Philips Technical Review, vol. 31, 1970, pp. 304-332.
Non-Final Office Action of U.S. Appl. No. 12/098,263 issued on Mar. 30, 2011.
Indian Office Action of Indian Application No. 2468/KOLNP/2007 issued on Jan. 28, 2011, corresponding to U.S. Appl. No. 12/098,263.
Non-Final Office Action of U.S. Appl. No. 12/854,001 issued on Apr. 6, 2011.
International Search Report for PCT/KR2010/003302 issued on Jan. 3, 2011, corresponding to U.S. Appl. No. 12/767,253.
Final Office Action dated Dec. 8, 2010 in U.S. Appl. No. 11/948,813.
Final Office Action dated Dec. 23, 2010 in U.S. Appl. No. 11/569,060.
Non Final Office Action dated Dec. 29, 2010 in U.S. Appl. No. 12/731,811.
Final Office Action dated Dec. 7, 2010 in U.S. Appl. No. 11/948,845.
Non Final Office Action dated Nov. 26, 2010 in U.S. Appl. No. 12/440,001.
Non Final Office Action dated Nov. 24, 2010 in U.S. Appl. No. 12/093,441.
Final Office Action dated Nov. 30, 2010 in U.S. Appl. No. 11/024,722.
Non Final Office Action dated Nov. 30, 2010 in U.S. Appl. No. 12/196,923.
Notice of Allowance dated Aug. 18, 2010 in U.S. Appl. No. 12/098,263.
Final Office Action dated May 11, 2010 in U.S. Appl. No. 12/098,263.
Non Final Office Action dated Mar. 17, 2010 in U.S. Appl. No. 11/024,722.
Non Final Office Action dated Aug. 17, 2010 in U.S. Appl. No. 11/948,845.
EP Search Report dated Sep. 1, 2010 in EP Appl No. 08015119 correpsonding to U.S. Appl. No. 12/440,001.
EP Search Report dated Oct. 6, 2010 in EP Appl No. 07745750.5—corresponding to U.S. Appl. No. 12/295,438.
Non Final Office Action dated Jun. 16, 2010 in U.S. Appl. No. 12/097,741.
Final Office Action dated Nov. 12, 2010 in U.S. Appl. No. 12/097,741.
Non-Final Office Action dated Aug. 10, 2010 in U.S. Appl. No. 11/024,722.
Final Office Action dated Jun. 21, 2010 in U.S. Appl. No. 11/569,060.
Non-Final Office Action dated Apr. 30, 2010 in U.S. Appl. No. 11/568,769.
Final Office Action dated Sep. 9, 2010 in U.S. Appl. No. 11/568,769.
CN Office Action dated Feb. 5, 2010 in CN Appl. No. 2005100023042.
European Search Report of Oct. 26, 2010 in EP 10 17 7817, corresponding to U.S. Appl. No. 11/024,722.
Non-Final Office Action dated Aug. 18, 2010 in U.S. Appl. No. 11/948,813.
Non-Final Office Action dated Aug. 10, 2010 in U.S. Appl. No. 12/731,811.
IP Australia Office Action dated Jul. 2, 2010 for AU Patent Appl. No. 2005-319965, corresponding to U.S. Appl. No. 12/098,263.
TW Office Action of Sep. 10, 2010 in TW Patent Appl. No. 098123458.
European Search Report of Sep. 23, 2010 in European Patent Appl. No. 10 16 4970.
Non-final office action dated May 29, 2009 issued in U.S. Appl. No. 11/024,722, filed Dec. 30, 2004.
Notice of Allowance dated May 4, 2009 issued in U.S. Appl. No. 11/024,702.
Non-final office action dated Nov. 29, 2007 issued in U.S. Appl. No. 11/024,702, filed Dec. 30, 2004.
Non-final office action dated Aug. 12, 2009 issued in U.S. Appl. No. 11/569,060, filed Jun. 22, 2007.
Non-final office action dated Jan. 13, 2010 issued in U.S. Appl. No. 11/569,060, filed Jun. 22, 2007.
Non-final office action dated Nov. 17, 2009 issued in U.S. Appl. No. 12/097,741, filed Oct. 9, 2008.
Bogner et al., DE 102 33 050 A1, Feb. 5, 2004, Machine Traslation.
Final office action dated Feb. 7, 2007 issued in U.S. Appl. No. 11/024,702, filed Dec. 30, 2004.
Non-final office action dated Jun. 22, 2006 issued in U.S. Appl. No. 11/024,702, filed Dec. 30, 2004.
Non-final office action dated Nov. 29, 2006 issued in U.S. Appl. No. 11/024,722, filed Dec. 30, 2004.
Final office action dated Oct. 28, 2009 issued in U.S. Appl. No. 11/024,722, filed Dec. 30, 2004.
Non-final office action dated May 23, 2007 issued in U.S. Appl. No. 11/024,722, filed Dec. 30, 2004.
Non-final office action dated Nov. 14, 2008 issued in U.S. Appl. No. 11/024,722, filed Dec. 30, 2004.
Non-final office action dated Nov. 2, 2009 issued in U.S. Appl. No. 12/098,263.
Ralchenko, Yu., Kramida, A.E., Reader, J. and NIST ASD Team (2008). NIST Atomic Spectra Database (version 3.1.5), [Online]. Available: http://physics.nist.gov/asd3 [Feb. 27, 2009]. National Institute of Standards and Technology, Gaithersburg, MD.
N. S. Akhmetov, "Inorganic Chemistry", Moscow "Vysshaya Shkola", 1975; (partial translation; translated pp. 332-333, 372-373, 384-385, 427, 432, 436, 445, 471, 476, 486, 491, 496-497, 501, 546-549).
Markovsky L, Ya. et al., Phosphors (Moscow-Leningrad, Khimiya Publishers, 1966, p. 7 (partial translation).
Search Report dated Apr. 11, 2006 for EP Application No. EP04106880.0.
Search Report dated Nov. 5, 2008 for EP Application No. EP06812549.1.
Search Report dated Aug. 21, 2007 for EP Application No. EP04106882.6.
International Search Report for PCT/KR2010/003285 issued on Jan. 24, 2011, corresponding to U.S. Appl. No. 12/773,514.
N. A. Toropov, et al "Inorganic and Analytical Chemistry—a Study of the Formation of Solid Solutions of Tristrontium Silicate . . . "published by Institute of Silicate Chemistry, Academy of Sciences of the USSR. pp. 1918-1921, submitted Aug. 21, 1962.
R. Chen, et al., "Developments in Luminescence and Display Materials Over the Last 100 Years as Reflected in Electrochemical Society Publications", Journal of the Electrochemical Society, vol. 149 No. 9, pp. 69-78 (2002).
G.L. Miessler & D.A. Tarr, "Inorganic Chemistry", 3rd ed., Pearson / Prentice Hall, New Jersey, pp. 117-118 (2004).
Wanmaker, et al., "Luminescence of Copper-Activated Orthophosphates of the Type ABPO (A=Ca, Sr, or Ba and B=Li, Na or K)", Journal of the Electrochemical Society, vol. 109, No. 2, pp. 109-113 (Feb. 1962).
Wanmaker, et al., "Luminescence of Copper-Activated Calcium and Strontium Orthophosphates", Journal of the Electrochemical Society, vol. 106, No. 12, pp. 1027-1031 (Dec. 1959).
Chinese First Office Action issued on Jul. 2, 2013 in Chinese Patent Application No. 201080028841.3.
Extended European Search Report issued on Jul. 9, 2013 in European Patent Application No. 10839706.
Taiwanese Preliminary Notice of First Office Action issued on Sep. 18, 2013 in Taiwanese Patent Application No. 099144790.
H. S. Jang, et al., "Emission Band Change of (Sr1-xMx)3SiO5:Eu<2+> (M= Ca, Ba) phosphor for white light sources using blue/near-ultraviolet LEDs", Journal of the electrochemical Society, vol. 156, No. 6, Apr. 6, 2009 pp. J138-J142.

* cited by examiner

LUMINESCENT SUBSTANCES HAVING EU$^{2+}$-DOPED SILICATE LUMINOPHORES

CROSS-REFERENCE TO RELATED APPLICATIONS

This application claims priority from and the benefit of German Patent Application No. 10 2009 030 205.0, filed on Jun. 24, 2009, and Korean Patent Application No. 10-2009-0080263, filed on Aug. 28, 2009, which are hereby incorporated by reference for all purposes as if fully set forth herein.

BACKGROUND OF THE INVENTION

1. Field of the Invention

Exemplary embodiments of the present invention relate to inorganic silicate-based luminescent substances which can be used as radiation converters for converting higher-energy primary radiation, for example (ultraviolet) UV radiation or blue light. The higher-energy primary radiation is converted into a longer-wave visible radiation and can therefore be is employed in corresponding light-emitting arrangements, such as light emitting diodes (LEDs) emitting colored or white light.

2. Discussion of the Background

Europium-activated alkaline earth metal oxyorthosilicates such as $Sr_3SiO_5$:Eu have become known for use in LEDs emitting colored or white light. The element strontium in these compounds may also be completely or partly replaced by other alkaline earth metal ions.

Such a strontium silicate-based luminescent substance for long-wave LEDs emitting UV light is described in WO 2004/085570AI with the structure $Sr_{3-x}SiO_5$:Eu$^{2+}$, where x=0<x≤1. The luminescent substance is said to have high luminescence efficiency. WO 2006/081803AI discloses a luminescent substance from the class consisting of oxyorthosilicates with the structure (Sr, Ba, Ca)$_3$SiO$_5$:Eu.

These known luminophores emit in the yellow to orange range of the visible spectrum and, with excitation by UV radiation or blue light, have the high luminescence efficiencies required for the relevant technical applications. Moreover, they display small full-widths at half maximum of the emissions spectra, which are advantageous for various applications. They also have low temperature extinction.

US 2006/261309A1 has disclosed luminescent mixtures which emit yellow light and have two silicate-based phases. These luminescent mixtures have an emission intensity in the wavelength range from 555 nm to 580 nm if they are excited by a radiation source having a wavelength range of 220 nm to 530 nm. The first phase includes a crystal structure (M1)$_2$SiO$_4$, and the second phase includes a crystal structure (M2)$_3$SiO$_5$. M1 and M2 are each selected from the group which consists of Sr, Ba, Mg, Ca and Zn. At least one of the phases of the mixture is comprises greater than or equal to 0.0001 percent by weight of Mg, and at least one of the phases is activated with divalent europium (Eu$^{2+}$). In addition, at least one of the phases comprises a dopant D which is selected from the group which consists of F, Cl, Br, S and N. At least one of the dopant atoms are arranged at lattice sites of the oxygen atom of the silicate crystal host of the luminescent substance.

WO 2007/035026A1 describes a silicate luminescent substance for emitting UV light with long-wave excitation, which has a color coordinate of x=0.50 to 0.64 and y=0.38 to 0.51. This is represented by the formula $(Sr_{1-x-y-z}A_xBa_nZn_y)_3SiO_5$:Re$_z$, where A is at least one alkaline earth metal which is selected from Ca and Mg. R denotes a rare earth metal and 0≤x≤0.5; 0<y≤0.5; 0<z<0.2; and 0<n<1. The luminescent substance is prepared from a stoichiometric mixture of strontium, barium, zinc, and silicon dioxide as matrix components and rare earth metal as an active substance component. The resulting mixture is dried at 100 to 150° C. for preparation of the luminescent substance. This is followed by heat treatment of the luminescent substance at 800 to 1500° C. under a mixed gas atmosphere comprising nitrogen and hydrogen. 0.001 to 0.5 mol of alkaline earth metal and 0.001 to 0.5 mol of zinc are then added to the matrix component per 1 mol of strontium.

The disadvantage of these known luminescent substances is that they may have a relatively short lifespan under conditions of use. This is due in particular to the high moisture sensitivity of the europium-doped alkaline earth metal oxyorthosilicates. Such a substantial disadvantage may limit the technical applicability of the above luminophores.

SUMMARY OF THE INVENTION

Exemplary embodiments of the invention provide chemically modified oxyorthosilicate luminescent substances having improved properties, in particular having increased stability to atmospheric humidity.

Exemplary embodiments of the present invention also provide stabilization of the solid-state matrix, improved resistance of the corresponding luminophores to atmospheric humidity and other environmental factors, and longevity of the luminescent substances.

Additional features of the invention will be set forth in the description which follows, and in part will be apparent from the description, or may be learned by practice of the invention.

Exemplary embodiments of the present invention disclose a luminescent substance with Eu$^{2+}$-doped silicate luminophores including alkaline earth metal oxyorthosilicates, rare earth metal oxyorthosilicates, and solid solutions in the form of mixed phases arranged between the alkaline earth metal oxyorthosilicates and rare earth metal oxyorthosilicates.

Exemplary embodiments of the present invention also disclose a light emitting diode including a luminescent substance with Eu$^{2+}$-doped silicate luminophores including alkaline earth metal oxyorthosilicates, rare earth metal oxyorthosilicates, and solid solutions in the form of mixed phases arranged between the alkaline earth metal oxyorthosilicates and rare earth metal oxyorthosilicates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
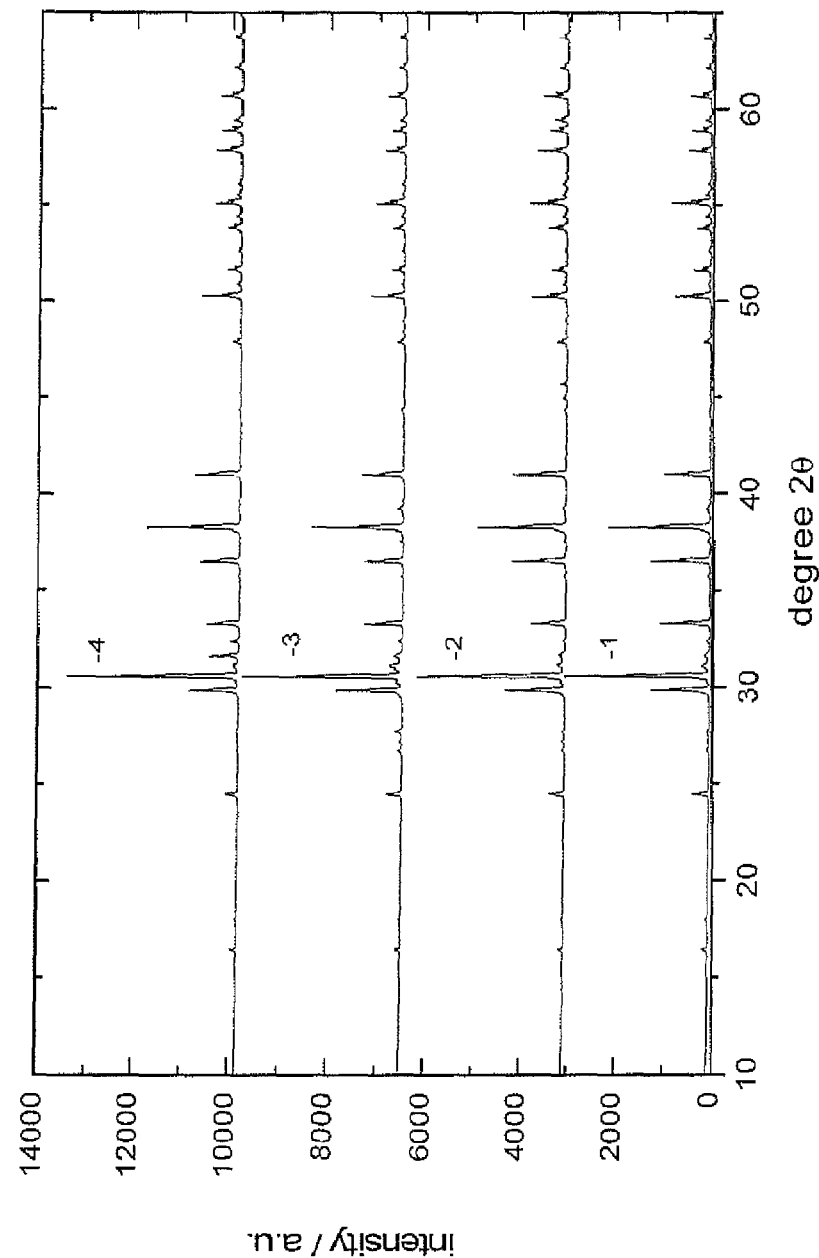
FIG. 1 shows the X-ray diffraction diagrams of different luminescent substances according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The preparation of the luminescent substances according to the exemplary invention includes multiple high-temperature solid-state reactions. Alkaline earth metal, rare earth metal carbonates or the corresponding oxides, and colloidal $SiO_2$ are preferably used as the starting material. It may be possible also to add certain amounts of fluxes or mineralization additives, such as $NH_4Cl$, or certain alkali metal or alkaline earth metal fluorides, to the reaction mixture for promoting the reactivity and for controlling the particle size distribution of the resulting luminophores. These starting materials are thoroughly mixed and then ignited for 1 to 48 hours at temperatures of 1300 to 1700° C. in an inert or reducing atmosphere. The main ignition process may also have a plurality of ignition stages in different temperature ranges to optimize the properties of the luminescent substance. After the end of the ignition process, the samples are cooled to room temperature and subjected to suitable post-treatment processes for the elimination of flux residues, the minimization of surface defects, or the fine adjustment of the particle size distribution.

Instead of the colloidal silica, silicon nitride ($Si_3N_4$) may also alternatively be used as a reactant for the reaction with the alkaline earth metal and rare earth metal compounds used. It is also possible to first prepare the respective individual alkaline earth metal or rare earth metal oxyorthosilicate components separately from one another and then to ensure the solid solution formation by repeated thermal treatment in a temperature range suitable for the purpose.

Detailed information on the preparation of the luminescent substances according to the exemplary invention is described below with reference to a plurality of working examples.

Example 1

Example 1 first describes the preparation of a strontium oxyorthosilicate luminescent substance having the composition $(Sr_{2.95}Ba_{0.01}Eu_{0.04})SiO_5$, which is to be regarded as reference material for evaluating the advantages of the luminescent substances of the exemplary invention.

For the preparation of this luminescent substance, 217.75 g of $SrCO_3$, 0.99 g of $BaCO_3$, 3.52 g of $Eu_2O_3$, 31.54 g of $SiO_2$, and 2.68 g of $NH_4Cl$ are thoroughly mixed and then ignited for 4 hours at a temperature of 1350° C. in a forming gas atmosphere. After the end of the ignition process, the ignited material is homogenized by milling and then subjected again to a thermal treatment at 1350° C. for two hours in a reducing $N_2/H_2$ atmosphere having a hydrogen concentration of at least 5%. The post-treatment of the cooled ignited material includes the milling thereof, the washing processes, and the drying and sieving of the end products.

Example 2

Example 2 describes the synthesis of the luminescent substance according to the exemplary invention having the composition $0.99.(Sr_{2.95}Ba_{0.01}Eu_{0.04})SiO_5.0.01.Y_2SiO_5$. This luminescent substance is prepared while maintaining the ignition conditions described in Example 1, the following starting materials and amounts used being: 215.58 g of $SrCO_3$, 0.98 g of $BaCO_3$, 1.13 g of $Y_2O_3$, 3.47 g of $Eu_2O_3$, 31.54 g of $SiO_2$, and 2.68 g of $NH_4Cl$.

Example 3

In the preparation of the luminescent substance according to the exemplary invention having the composition $0.95.(Sr_{2.8875}Ba_{0.025}Cu_{0.0025}Eu_{0.10})SiO_5.0.05.Gd_2SiO_4$, 202.48 g of $SrCO_3$, 0.94 g of $BaCO_3$, 0.094 g of CuO, 9.06 g of $Gd_2O_3$, 8.36 g of $Eu_2O_3$, and 30.94 g of $SiO_2$ are used as starting materials in Example 3, to which 4.0 g of $NH_4Cl$ are added as a flux. After thorough homogenization, the starting mixture is transferred to corundum crucibles, which are positioned in a high temperature furnace. In this, the solid mixtures are subjected to an ignition regime which has a first 10 hour holding stage at 1200° C., a second 5 hour holding stage at 1550° C., and a third 2 hour holding stage at 1350° C. s. The ignitions are performed in pure nitrogen until a 1550° C. ramp has been reached, in an $N_2/H_2$ mixture with 20% hydrogen during the 1550° C. phase, and then in forming gas (5% hydrogen) during the 1350° C. ignition stage. Finally, the mixture is rapidly cooled after the third holding stage. The post-treatment of the samples of the luminescent substance is performed in the manner described in Example 1.

Example 4

Preparation of the luminescent substance according to Example 4 comprises first preparing the modified strontium oxyorthosilicates and the rare earth metal oxyorthosilicates separately from one another and then performing the solid solution formation in a separate production step. The resulting luminescent substance has the composition $0.995.(Sr_{2.498}Ba_{0.45}Ca_{0.002}Eu_{0.05})SiO_5.0.005.La_2SiO_5$.

The synthesis of the $(Sr_{2.498}Ba_{0.45}Ca_{0.002}Eu_{0.05})SiO_5$ component is performed as in Example 1 in the following amounts: 184.39 g of $SrCO_3$, 44.40 g of $BaCO_3$, 0.078 g of $CaF_2$, 3.96 g of $Eu_2O_3$, and 31.54 g of $SiO_2$. The lanthanum oxyorthosilicate $La_2SiO_5$ is prepared in a one-stage ignition process with the use of 325.81 g of $La_2O_3$, 55.2 g of $SiO_2$, and 2.68 g of $NH_4Cl$, the thoroughly mixed starting materials being ignited for 6 hours at temperatures of 1380° C. in forming gas.

For the production of the luminescent substance according to the exemplary invention in its composition, 197.23 g of the prepared $(Sr_{2.498}Ba_{0.45}Ca_{0.002}Eu_{0.05})SiO_5$ component and 0.96 g of $La_2SiO_5$ are subjected to a thorough mixing procedure and then heated for 6 hours at 1150° C. in a nitrogen-hydrogen (5%) stream.

FIG. 1 shows the X-ray diffraction diagrams of those luminescent substances which are made by the processes described in Examples 1 to 4. They have in principle the reflections of $Sr_3SiO_5$ which are known from the literature, the diffraction angles being shifted slightly compared with the pure $Sr_3SiO_5$ phase owing to the lattice substitutions carried out. Indications of the reflections which occur in the monoclinic $SE_2SiO_5$ phases are not detectable in any of the diagrams. Such reflections occur only outside of the stated concentration limits for the formation of solid solutions between the strontium oxyorthosilicate and the corresponding rare earth metal oxyorthosilicates.

TABLE 1

| Material | Lattice constants | |
|---|---|---|
| | a = b | c |
| Commercially available $Sr_3SiO_5$: Eu | 6.962 | 10.771 |
| $(Sr_{2.95}Ba_{0.01}Eu_{0.04})SiO_5$ — reference | 6.957 | 10.770 |
| 0.99 $(Sr_{2.95}Ba_{0.01}Eu_{0.04})SiO_5$ — 0.01 $Y_2SiO_5$ | 6.955 | 10.769 |
| 0.975 $(Sr_{2.95}Ba_{0.01}Eu_{0.04})SiO_5$ — 0.025 $Y_2SiO_5$ | 6.958 | 10.770 |
| 0.95 $(Sr_{2.95}Ba_{0.01}Eu_{0.04})SiO_5$ — 0.05 $Y_2SiO_5$ | 6.954 | 10.766 |
| 0.98 $(Sr_{2.95}Ba_{0.01}Eu_{0.04})SiO_5$ — 0.02 $Gd_2SiO_5$ | 6.957 | 10.770 |
| 0.95 $(Sr_{2.95}Ba_{0.01}Eu_{0.04})SiO_5$ — 0.05 $Gd_2SiO_5$ | 6.958 | 10.773 |
| 0.925 $(Sr_{2.95}Ba_{0.01}Eu_{0.04})SiO_5$ — 0.075 $Gd_2SiO_5$ | 6.956 | 10.769 |
| 0.995 $(Sr_{2.95}Ba_{0.01}Eu_{0.04})SiO_5$ — 0.005 $La_2SiO_5$ | 6.954 | 10.767 |
| 0.99 $(Sr_{2.95}Ba_{0.01}Eu_{0.04})SiO_5$ — 0.01 $La_2SiO_5$ | 6.957 | 10.768 |
| 0.975 $(Sr_{2.95}Ba_{0.01}Eu_{0.04})SiO_5$ — 0.025 $La_2SiO_5$ | 6.957 | 10.769 |

Table 1 lists the lattice constants of luminescent substances according to the exemplary invention which are prepared according to the preparation method stated in Example 2. The lattice constants of the luminophores are similar to one another. In view of the comparatively small proportions of $SE_2SiO_5$ in the oxyorthosilicate solid solutions used as base lattices of the luminescent substances, no clear trends are detectable for the variation of the lattice constants.

In Table 2, indications of solid solution formation between the differing oxyorthosilicate lattices are evident from the listed luminescence parameters of the luminescent substances according to the exemplary invention. In particular, the systematic shifts of the color coordinates and of the full widths at half maximum of the emissions spectra which occur with an increase in proportion of $SE_2SiO_5$ indicate the formation of solid solutions. Differences occur with the addition of yttrium oxyorthosilicate, gadolinium oxyorthosilicate, or lanthanum oxyorthosilicate. These are very probably due to the differences in the ionic radii of the respective rare earth elements.

The luminescence efficiencies of the inventive luminescent substances and the temperature dependencies thereof show improvements over the known $Sr_3SiO_5$:Eu luminescent substances.

TABLE 2

| Material | Powder Intensity 450 nm excitation % | Color coordinates x value | Color coordinates y value | FWHM nm | Intensity 150° C. % |
|---|---|---|---|---|---|
| Commercially available $Sr_3SiO_5$: Eu | 98.3 | | | | 91.3 |
| $(Sr_{2.95}Ba_{0.01}Eu_{0.04})SiO_5$ — reference | 100 | 0.5373 | 0.4604 | 68.4 | 91.5 |
| 0.99 $(Sr_{2.95}Ba_{0.01}Eu_{0.04})SiO_5$ — 0.01 $Y_2SiO_5$ | 99.6 | 0.5371 | 0.4604 | 69.5 | 91.4 |
| 0.975 $(Sr_{2.95}Ba_{0.01}Eu_{0.04})SiO_5$ — 0.025 $Y_2SiO_5$ | 100.8 | 0.5362 | 0.4611 | 70.5 | 92.5 |
| 0.95 $(Sr_{2.95}Ba_{0.01}Eu_{0.04})SiO_5$ — 0.05 $Y_2SiO_5$ | 98.7 | 0.5343 | 0.4629 | 70.9 | 92.1 |
| 0.98 $(Sr_{2.95}Ba_{0.01}Eu_{0.04})SiO_5$ — 0.02 $Gd_2SiO_5$ | 101.3 | 0.5361 | 0.4614 | 70.1 | 93.2 |
| 0.95 $(Sr_{2.95}Ba_{0.01}Eu_{0.04})SiO_5$ — 0.05 $Gd_2SiO_5$ | 100.2 | 0.5358 | 0.4615 | 71.3 | 91.4 |
| 0.925 $(Sr_{2.95}Ba_{0.01}Eu_{0.04})SiO_5$ — 0.075 $Gd_2SiO_5$ | 97.9 | 0.5346 | 0.4625 | 72.7 | 92.0 |
| 0.995 $(Sr_{2.95}Ba_{0.01}Eu_{0.04})SiO_5$ — 0.005 $La_2SiO_5$ | 102.0 | 0.5377 | 0.4602 | 68.5 | 87.6 |
| 0.99 $(Sr_{2.95}Ba_{0.01}Eu_{0.04})SiO_5$ — 0.01 $La_2SiO_5$ | 102.5 | 0.5382 | 0.4596 | 68 | 87.2 |
| 0.975 $(Sr_{2.95}Ba_{0.01}Eu_{0.04})SiO_5$ — 0.025 $La_2SiO_5$ | 99.2 | 0.5352 | 0.4624 | 67.9 | 87 |

Figure 2:
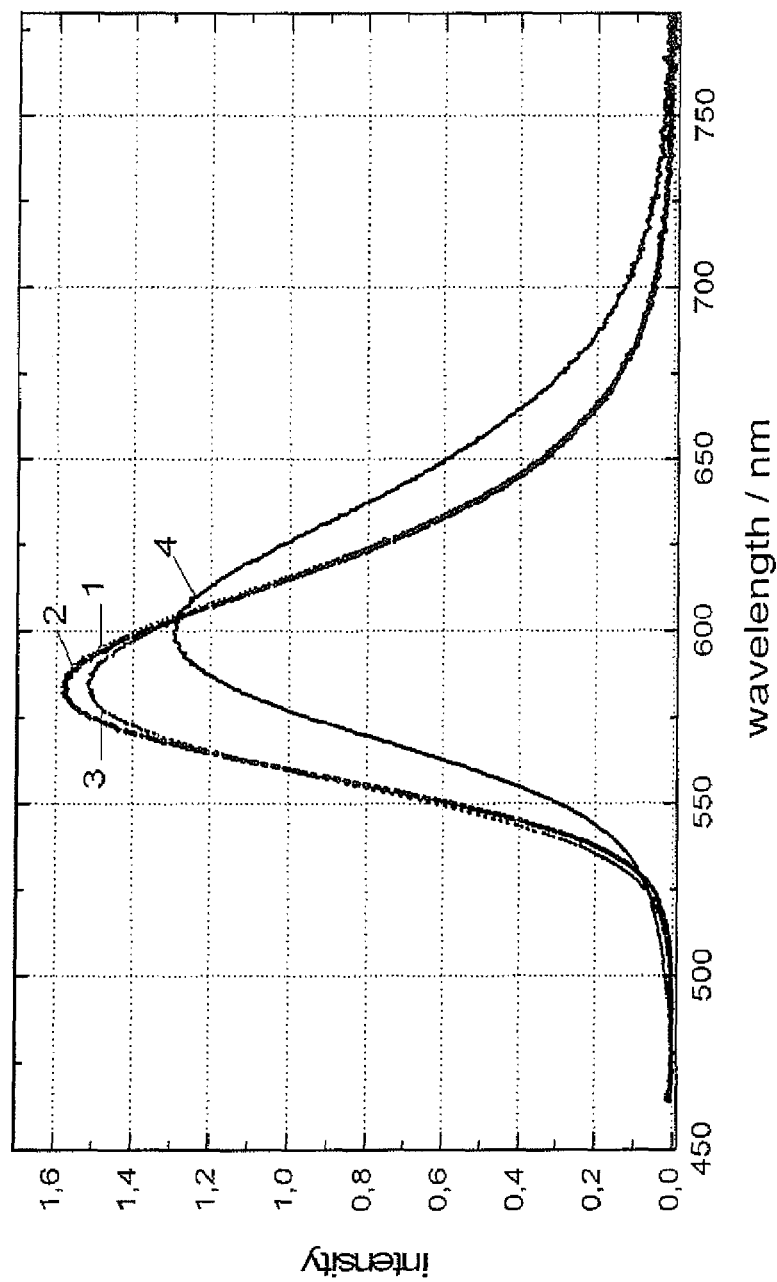
FIG. 2 shows the emission spectra of inventive luminescent substances according to exemplary embodiments of the present invention.

The results documented in Table 2 show that the luminescent substances according to the exemplary invention may have higher luminescence efficiencies depending on the preparation methods. In FIG. 2, the emissions spectra of the luminescent substances which are made by the processes described in Examples 1 to 4 are shown together.

For assessing the moisture stability of the materials, the luminescent substances are stored in a conditioned chamber for a period of 7 days at a temperature of 85° C. and 85% relative humidity. Thereafter, the luminophores are dried at 150° C. and then subjected to a comparative measurement of the luminescence efficiency. Exemplary results of such investigations are shown in Table 3.

TABLE 3

| Material | Powder Intensity 450 nm excitation % | Intensity 150° C. % | Intensity after moistening test % |
|---|---|---|---|
| Commercially available $Sr_3SiO_5$: Eu | 98.3 | 91.3 | 69.3 |
| $(Sr_{2.95}Ba_{0.01}Eu_{0.04})SiO_5$ — reference | 100 | 91.6 | 72.0 |
| 0.99 $(Sr_{2.95}Ba_{0.01}Eu_{0.04})SiO_5$ — 0.01 $Y_2SiO_5$ | 99.6 | 91.4 | 93.6 |

TABLE 3-continued

| Material | Powder Intensity 450 nm excitation % | Intensity 150° C. % | Intensity after moistening test % |
|---|---|---|---|
| 0.975 $(Sr_{2.95}Ba_{0.01}Eu_{0.04})SiO_5$ — 0.025 $Y_2SiO_5$ | 100.8 | 92.5 | 95.1 |
| 0.95 $(Sr_{2.95}Ba_{0.01}Eu_{0.04})SiO_5$ — 0.05 $Y_2SiO_5$ | 98.7 | 92.1 | 91.3 |
| 0.98 $(Sr_{2.95}Ba_{0.01}Eu_{0.04})SiO_5$ — 0.02 $Gd_2SiO_5$ | 101.3 | 93.2 | 89.7 |
| 0.95 $(Sr_{2.95}Ba_{0.01}Eu_{0.04})SiO_5$ — 0.05 $Gd_2SiO_5$ | 100.2 | 91.4 | 94.2 |
| 0.925 $(Sr_{2.95}Ba_{0.01}Eu_{0.04})SiO_5$ — 0.075 $Gd_2SiO_5$ | 97.9 | 92.0 | 95.3 |
| 0.995 $(Sr_{2.95}Ba_{0.01}Eu_{0.04})SiO_5$ — 0.005 $La_2SiO_5$ | 102.0 | 87.6 | 90.3 |
| 0.99 $(Sr_{2.95}Ba_{0.01}Eu_{0.04})SiO_5$ — 0.01 $La_2SiO_5$ | 102.5 | 87.2 | 88.8 |
| 0.975 $(Sr_{2.95}Ba_{0.01}Eu_{0.04})SiO_5$ — 0.025 $La_2SiO_5$ | 99.2 | 87 | 86.4 |

From the data shown, it is evident that both the known luminescent substances of the structure $Sr_3SiO_5$:Eu and the $(Sr_{2.95}Ba_{0.01}Eu_{0.04})SiO_5$ luminescent substance of Example 1 have only about 70% of their original luminescence efficiency after the moistening test. In comparison, the europium-doped oxyorthosilicate luminescent substances of Examples 2 to 4 having mixed-phased base lattices comprising alkaline earth metal oxyorthosilicates and rare earth metal oxyorthosilicates have improved moisture resistances. After storage in an 85° C./85% H atmosphere for seven days, luminescence efficiencies of greater than 90%, and in the case of optimized samples of greater than 95%, are still found. The arrangements comprising the conversion luminescent substances according to exemplary embodiments of the present invention are distinguished in particular by an improved temperature-dependent efficiency of the luminescence or quantum efficiency. The luminescent substances also exhibit a longer lifespan. In particular, the luminescent substances or luminophores display a high stability with respect to the radiation load occurring and with respect to the influence of atmospheric humidity and other environmental factors.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A luminescent substance with $Eu^{2+}$-doped silicate luminophores, comprising:
   solid solutions comprising mixed phases of alkaline earth metal oxyorthosilicates and rare earth metal oxyorthosilicates.

2. The luminescent substance of claim 1,
   wherein the $Eu^{2+}$-doped silicate luminophores are represented by the formula $(1-x)M^{II}_3SiO_5 \cdot xSE_2SiO_5$:Eu,
   where $M^{II}$ represents divalent metal ions comprising at least one ion selected from the group consisting of strontium ion and barium ion, and SE represents rare earth metals, and
   wherein $0<x\leq 0.5$.

3. The luminescent substance of claim 2,
   wherein $M^{II}$ further comprises at least one divalent metal ion selected from the group consisting of Mg, Ca, Cu, Zn, and Mn.

4. The luminescent substance of claim 3, wherein the proportion of the at least one divalent metal ion selected from the group consisting of Mg, Ca, Cu, Zn, and Mn is less than or equal to 0.5.

5. The luminescent substance of claim 2,
   wherein the rare earth metals comprise at least one trivalent metal ion selected from the group consisting of Y, La, and lanthanides with atomic numbers 58 to 71.

6. The luminescent substance of claim 2,
   wherein the rare earth metals comprise at least one trivalent metal ion selected from the group consisting of Y, La, and Gd.

7. The luminescent substance of claim 1,
   wherein the luminophores further comprise a divalent rare earth metal ion or a trivalent rare earth metal ion as activators.

8. The luminescent substance of claim 7,
   wherein the divalent rare earth metal ion activators comprise samarium ions or ytterbium ions.

9. The luminescent substance of claim 7,
   wherein the trivalent rare earth metal ion activators comprise cerium ions ($Ce^{3+}$).

10. The luminescent substance of claim 1,
    wherein the luminophores represented by formula $(1-x)(Sr_{3-a-b-z}Ba_aCa_bM^{II}_cEu_z)SiO_5 \cdot xSE_2SiO_5$,
    where $M^{II}$ is at least one element selected from the group consisting of Mg, Cu, Zn, and Mn,
    SE is an element selected from the group consisting of Y, La, and lanthanides with atomic numbers 58 to 71,
    $0<x\leq 0.2$,
    $0\leq a\leq 3$, $0\leq b\leq 0.05$, $0\leq c\leq 0.05$, and
    $z\leq 0.25$.

11. The luminescent substance of claim 10,
    wherein $0<x\leq 0.1$.

12. A light emitting diode comprising:
    a luminescent substance with $Eu^{2+}$-doped silicate luminophores, comprising:
    solid solutions comprising mixed phases of alkaline earth metal oxyorthosilicates and rare earth metal oxyorthosilicates.

13. The luminescent substance of claim 10,
    wherein the luminophores further comprise a divalent rare earth metal ion or a trivalent rare earth metal ion as activators.

14. The luminescent substance of claim 13,
    wherein the divalent rare earth metal ion activators comprise samarium ions or ytterbium ions.

15. The luminescent substance of claim 13,
    wherein the trivalent rare earth metal ion activators comprise cerium ions ($Ce^{3+}$).

16. The luminescent substance of claim 10,
    wherein the luminescence efficiency of the luminescent substance is greater than or equal to 86.4% after storage at 85° C. and 85% humidity for 7 days.

* * * * *